United States Patent [19]

Ratzlaff et al.

[11] Patent Number: 5,216,873
[45] Date of Patent: Jun. 8, 1993

[54] WRAPPER CUTOFF MECHANISM FOR ROUND BALERS

[75] Inventors: Howard J. Ratzlaff, Hesston; Ferol S. Fell, Newton, both of Kans.

[73] Assignee: Hay & Forage Industries, Hesston, Kans.

[21] Appl. No.: 772,238

[22] Filed: Oct. 7, 1991

[51] Int. Cl.$^5$ .............................................. B65B 11/04
[52] U.S. Cl. ........................................ 53/587; 53/118; 53/389.3; 83/569
[58] Field of Search ................... 53/118, 587, 389.3; 83/230, 566, 569

[56] References Cited

U.S. PATENT DOCUMENTS

| | | | |
|---|---|---|---|
| 2,014,765 | 9/1935 | Hoppe | 53/389.3 X |
| 2,290,223 | 7/1942 | Black | 83/567 X |
| 3,710,664 | 1/1973 | Eveland | 83/230 |
| 4,208,853 | 6/1980 | English | 53/389.3 |
| 4,599,844 | 7/1986 | Clostermeyer | 53/587 X |
| 4,697,402 | 10/1987 | Anstey | 53/389.3 |
| 4,779,526 | 10/1988 | Frerich | 53/118 X |
| 4,896,477 | 1/1990 | Wagstaff | 53/389.3 X |

FOREIGN PATENT DOCUMENTS 382106 11/1964 Switzerland ..................... 83/567

OTHER PUBLICATIONS

John Deere Operator's Manual 435 and 535 Round Balers, OM-E79133 Issue L8; cover page, pp. 70-1, 80-2, 80-4, 80-7.

Primary Examiner—John Sipos
Attorney, Agent, or Firm—Hovey, Williams, Timmons & Collins

[57] ABSTRACT

The cutting mechanism has a stationary anvil and a movable knife that is swung across the path of travel of the taut, moving wrapper to deflect the wrapper into engagement with the anvil and accomplish severance. A tapered nose on the anvil fits into a slot along the length of the knife as the two components come together whereby the wrapper is stuffed by the nose of the anvil into the slot in a distorted condition, conforming to the shape of the nose and bending over a sharp edge along the slot. As the wrapper becomes gripped within the slot and bent over the cutting edge, it is severed cleanly from the roll and the severed length of the wrapper is delivered to the bale for completion of the wrapping cycle. The knife is in the nature of a tubular member with a slot in its peripheral wall so that the arcuate outer surface of the wall slidingly engages and keeps the wrapper out of contact with the sharp edge until the anvil enters the slot, thereby preventing premature snagging and severance of the wrapper by the sharp edge.

24 Claims, 5 Drawing Sheets

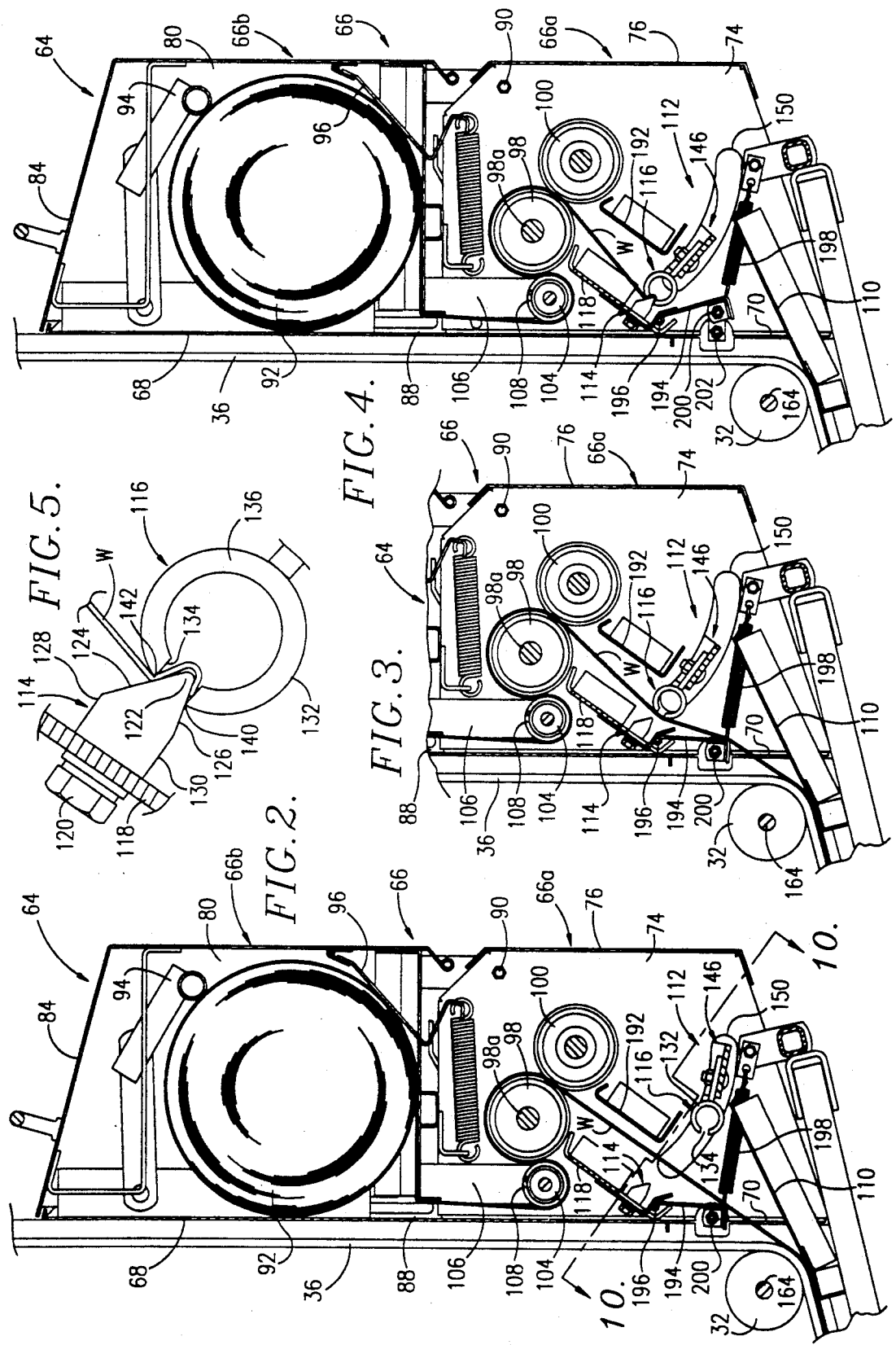

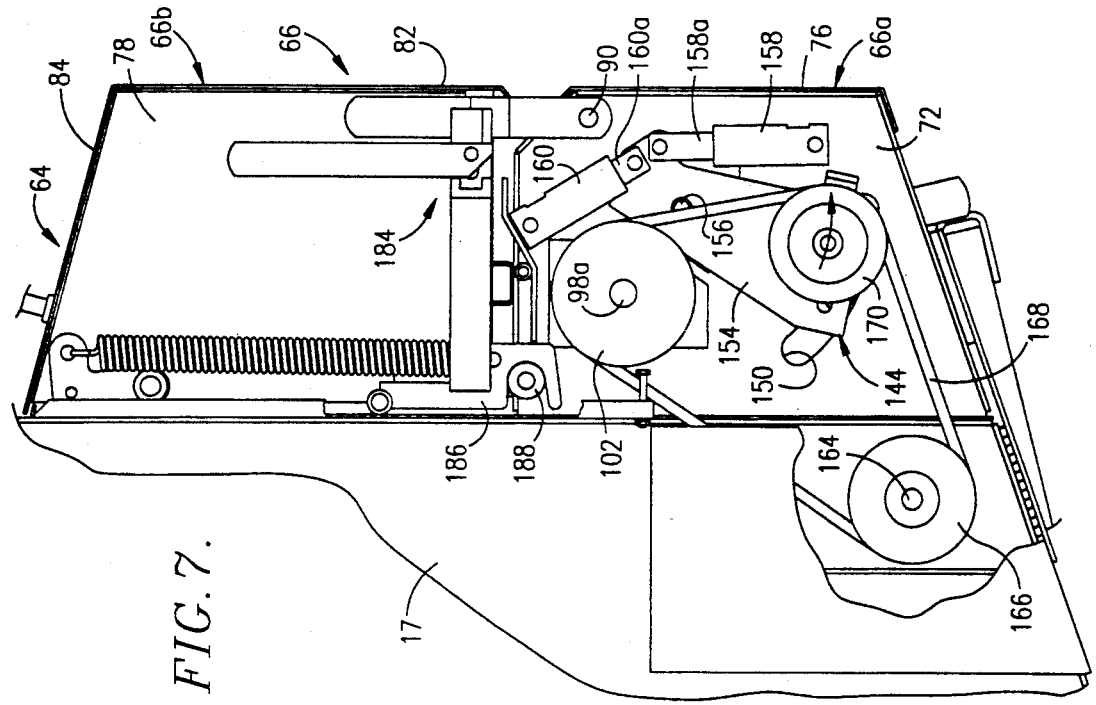
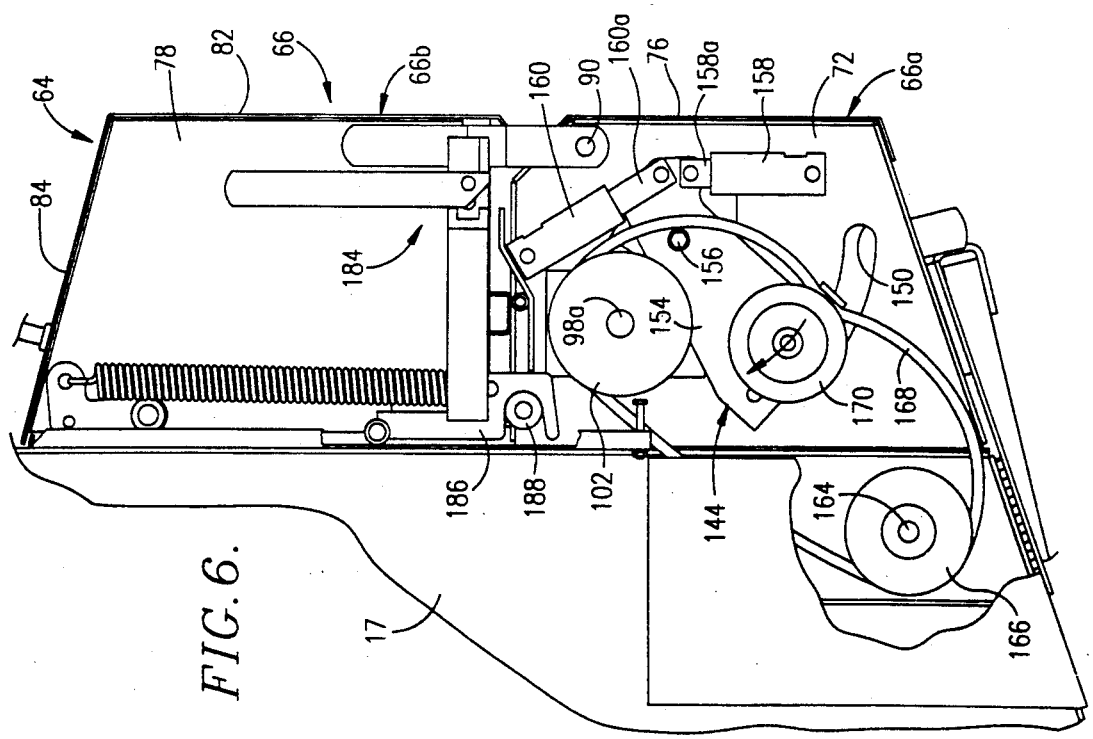

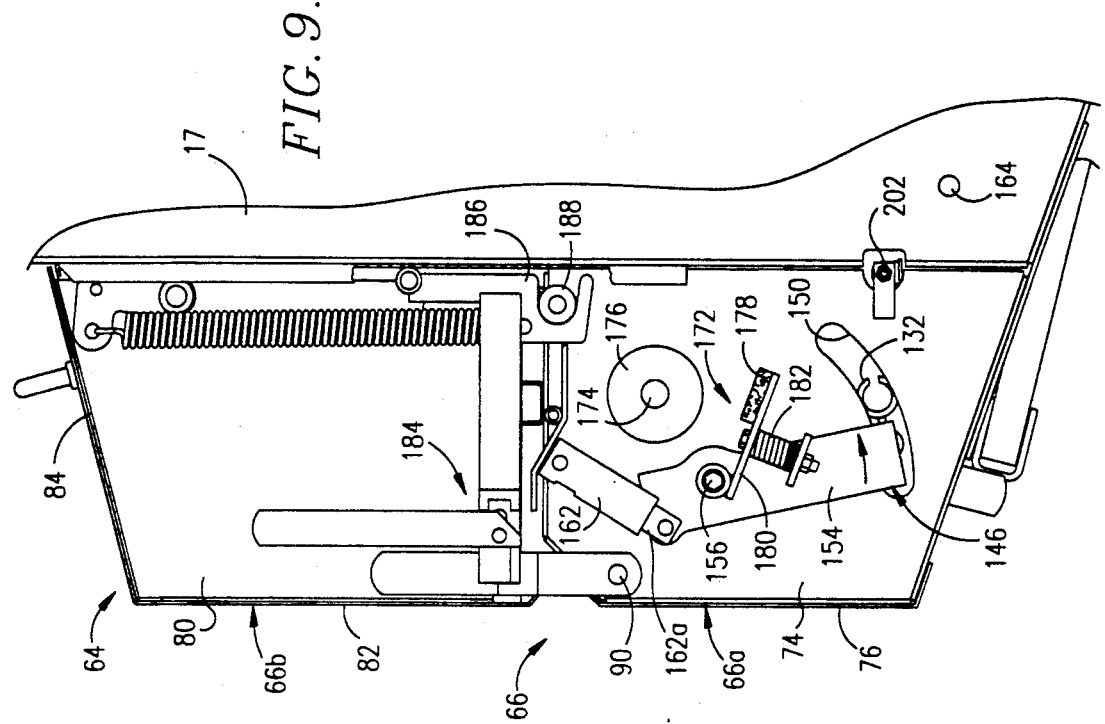
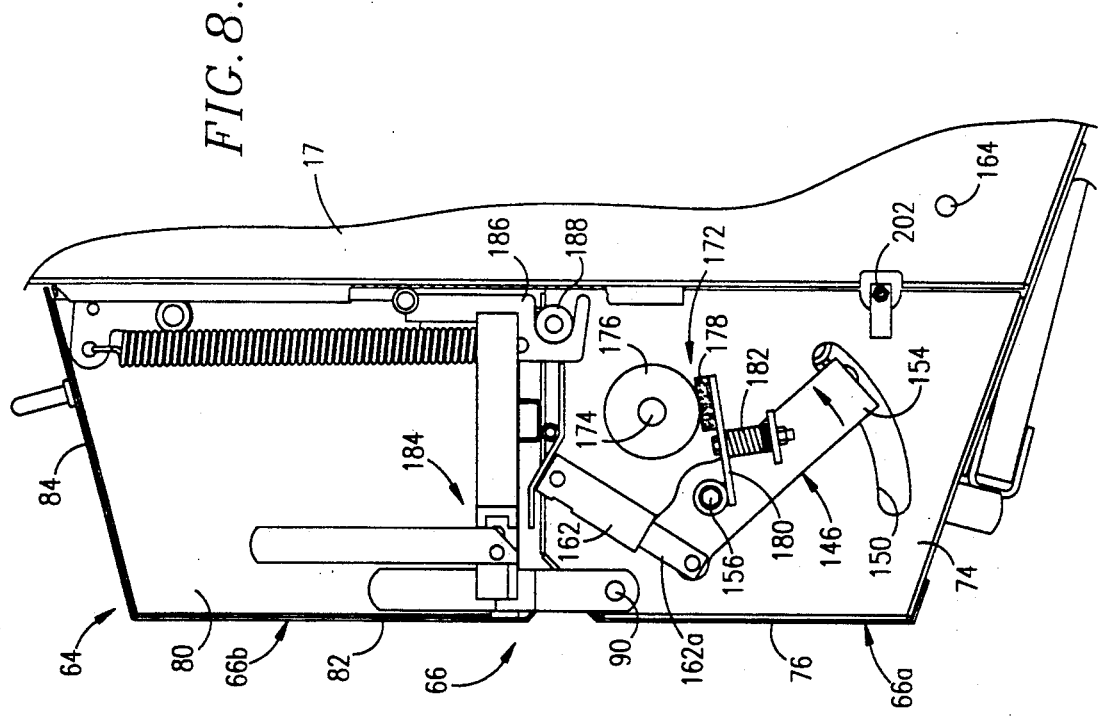

WRAPPER CUTOFF MECHANISM FOR ROUND BALERS

TECHNICAL FIELD

This invention relates to round balers and, more particularly, to apparatus associated with such balers for wrapping finished bales with net material or other wrapping material, and cleanly severing the wrapper prior to discharge of the wrapped bale from the machine.

BACKGROUND

It is important for the netting or other web material used to wrap a finished bale to be fully and cleanly severed after the completion of each wrapping cycle. However, problems sometimes arise due in part to the fact that the wrapper is typically several feet wide and an incomplete severance at any point along the width of the wrapper means that the wrapped segment is simply not fully separated from the remaining supply on the roll.

Such poor performance may be traced to a number of factors, such as misalignment of the long cutting surfaces due to inexact adjustment, warpage, or wear of the components.

Furthermore, in presently available designs, the sharp edges of the cutters may be exposed to the moving net wrap in such a manner that there is a premature or ragged cutoff of the wrap caused by all or part of the cutting edge snagging the wrapper before the desired instant of cut. If the wrapper fails to be severed, the farmer must first become aware of such mechanical failure, then climb down off the tractor, walk back to the baler, and perform the tedious task of manually severing the wrapper in preparation for continuing the baling process. Of course, if the farmer fails to realize that the wrapper has not been severed, the wrapped bale will be discharged upon initiation of the discharge cycle, but will take with it a stream of wrapper that continues to pull additional wrapping material from the roll as the baling process resumes. It is also possible that failure to sever the wrapper segment from the source of supply may lead to jam ups in the machine and subsequent mechanical breakdown.

SUMMARY OF THE INVENTION

Accordingly, one important object of the present invention is to provide a wrapper dispensing apparatus which is more reliable and less troublesome than prior devices of this type. Pursuant to this objective, the present invention contemplates the use of a special cutoff mechanism that employs interfitting cutter components that clamp the wrapper between themselves during the cutting cycle and manipulate the wrapper in such a way that severance is clean and sure.

More particularly, one of the cooperating components of the cutoff mechanism is in the nature of a long tube which swings against the taut wrapper during the severance cycle and deflects the wrapper against a cooperating anvil which in turn slips into a longitudinal slot on the tube, deforming the wrapper in the process so that it, too, will fit into the slot. As the deformed wrapper is bent tightly over the anvil and securely wedged into the slot by inclined clamping surfaces on a nose of the anvil, a cutting edge on the tube along the extremity of the slot severs the wrapper and allows the severed portion to travel onto the baling chamber where it is guided around the periphery of the awaiting bale. The arcuate cross-sectional configuration of the knife tube is such that it presents a protective guide surface for the wrapper adjacent the cutting edge along the slot so that even though the cutting tube is engaging the moving wrapper and deflecting it toward the anvil during the cutoff sequence, the wrapper slides smoothly along the guide surface without accidently snagging the cutting edge. It is only when the nose of the anvil enters the awaiting slo of the knife tube that the wrapper becomes sufficiently gripped and tightly stretched over the cutting edge to cause severance by the edge.

BRIEF DESCRIPTION OF THE DRAWINGS

FIG. 2 is an enlarged, fragmentary, vertical cross-sectional view of the wrapping apparatus with the near sidewall of the housing removed to reveal internal details of construction, the apparatus being illustrated with the knife tube in a retracted position and wrapping material being paid out by the nip rollers of the apparatus;

FIG. 3 is a fragmentary, vertical cross-sectional view of the apparatus similar to FIG. 2 but with the knife tube swung almost to its full operated position deflecting the taut wrapper material toward the cooperating anvil of the cutoff mechanism;

FIG. 4 is a cross-sectional view of the apparatus similar to FIGS. 2 and 3, but showing the knife tube fully operated into clamping relationship with its cooperating anvil and the wrapper fully severed, such condition being one which the cutoff mechanism assumes as it awaits the start of the next cutoff sequence;

FIG. 5 is an enlarged schematic representation of the two interfitting knife tube and anvil of the cutoff mechanism illustrating the manner in which the wrapper is clamped and severed during operation;

FIG. 6 is a fragmentary left side elevational view of the wrapper apparatus and the adjacent rear portions of the baler showing the apparatus in a standby condition with the clutch for the dispensing nip rolls disengaged;

FIG. 7 is a fragmentary, side elevational view of the apparatus similar to FIG. 6, but showing the clutch fully engaged to supply driving power to the nip rollers of the apparatus for paying out wrapping material;

FIG. 8 is a fragmentary, right side elevational view of the apparatus showing the brake for the nip rollers, the apparatus being illustrated in the standby condition corresponding to FIG. 6;

FIG. 9 is a fragmentary, right side elevational view of the apparatus similar to FIG. 8, but with the knife tube fully retracted whereby to engage the clutch in the manner illustrated in FIG. 7.

DETAILED DESCRIPTION

Figure 1:
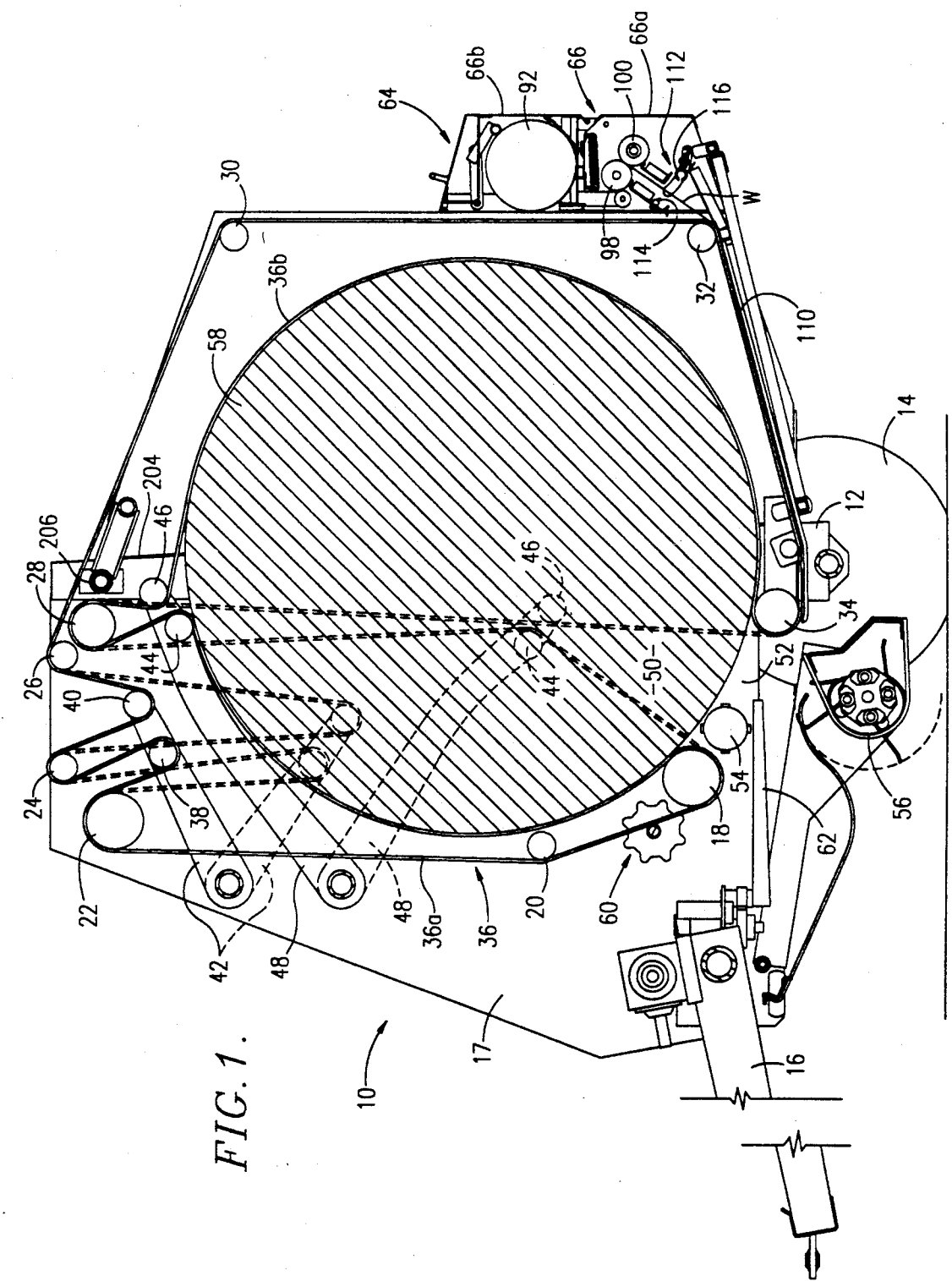
FIG. 1 is a fragmentary elevational view of a round baler with its near sidewall removed to reveal internal details of construction, such baler employing a wrapping apparatus in accordance with the present invention and showing in full lines a full size, ready-to-wrap bale within the baling chamber of the machine.

The round baler 10 selected for illustration in connection with the wrapping apparatus of the present invention includes a wheeled chassis 12 having ground wheels 14 and a forwardly extending tongue 16 that is adapted for connection with a towing vehicle (not shown). The chassis 12 carries a pair of upright, laterally spaced sidewalls 17 (see also, FIG. 10) which cooperate to define a space within which bale forming and bale wrapping operations may be carried out as the baler is advanced across a field. In the illustrated embodiment, a so-called "variable chamber" machine has been shown wherein the baling chamber is initially relatively small and then grows progressively larger as the bale increases in diameter within the machine. It will be appreciated, however, that the principles of the present invention are equally applicable to a "fixed chamber" machine in which the dimensions of the baling chamber are at least substantially constant throughout the baling cycle, with the diameter of the chamber corresponding substantially with the diameter of the full size bale when completed.

With the foregoing caveat in mind, the variable chamber baler illustrated herein includes a series of cooperating belts and rollers supported by the sidewalls 17 for compacting and rolling the bale as it forms within the machine. In this respect, the baler 10 is provided with a plurality of stationary rolls 18,20,22,24,26,28,30,32, and 34 which span the sidewalls 17 in a general circular pattern viewing FIG. 1 for guiding a plurality of endless, side-by-side belts 36 as the belts 36 are driven linearly during bale formation and wrapping. A pair of movable slack takeup rolls 38 and 40 are mounted near the upper portion of the baler on downwardly spring biased arm structure 42 to maintain tension on the belts 36, yet permit the paying out of stored slack as the bale increases in diameter during formation. Near the fore-and-aft center of the baler 10, the belts 36 are looped under the lower roll 18, over the upper roll 28, and under the lower roll 34 to present a pair of opposed, front and rear runs 36a and 36b which are initially generally upright, as illustrated in phantom in FIG. 1, but which become bowed out in fore-and-aft directions, as illustrated in solid lines, as the bale grows beyond its initial starting core dimensions. A pair of retaining rollers 44 and 46 are mounted on a second swingable arm structure 48 that is also spring-biased downwardly toward the phantom line position in FIG. 1, the retaining rollers 44,46 receiving the belt runs 36a and 36b therebetween so as to form a baling chamber 50 between the runs 36a,36b which is bounded at the sides by the sidewalls 17.

Initially, the chamber 50 assumes a generally upright, somewhat triangular configuration, as shown in phantom lines in FIG. 1, with the retaining rollers 44,46 at the apex of the chamber 50. Thereafter, the chamber 50 becomes distended and circular in transverse configuration as the growing bale pushes forwardly on the belt run 36a and rearwardly on the belt run 36b to cause additional slack to be paid out and for the arm 48 to rise as additional hay is progressively added to the bale.

The chamber 50 is open at the bottom to present an entrance 52 that is defined between the rear roll 34 and a starter roller 54. A pickup 56 supported generally below the entrance 52 and forwardly of the roll 34 is operable to lift crop material off the field as the baler 10 is advanced and to feed the material into the chamber 50 via the entrance 52.

The roll 18 and the roll 22 are drive rolls for the belts 36 and are driven in clockwise directions viewing FIG. 1. Thus, when the baling chamber 50 is in its initial upright condition, as shown in phantom lines in FIG. 1, the front run 36a is moving generally downwardly and forwardly while the rear run 36b is moving generally upwardly. Consequently, hay introduced into the chamber 50 via the entrance 52 is acted upon by the upwardly moving rear run 36b and the downwardly moving front run 36a so as to tumble forwardly and coil into a growing bale. Assisting in the initial starting of the core and the coil-up action is the starting roller 54 which is driven in a clockwise direction viewing FIG. 1.

During the formation of the bale, which is illustrated in its final size in solid lines in FIG. 1 and is denoted by the numeral 58, a small amount of hay is sloughed off the bale 58 due to slippage between the belts 36 and the surface of the bale, and some of that residue tends to collect within the open area immediately above the roll 18 and forwardly of the front belt run 36a. However, such accumulating material is immediately discharged from that area by the action of the cleanout discs broadly denoted by the numeral 60 in FIG. 1 which protrude into the collecting region and have their protruding portions moving downwardly in a direction oppositely to the upwardly moving belts 36 in that area. Such cleanout discs 60 are the subject of copending application Ser. No. 07/626,973 filed Dec. 13, 1990, in the names of Howard J. Ratzlaff, et al., assigned to the assignee of the present invention.

Once the bale 58 is fully formed, it is desirable that the bale be tightly wrapped with either twine or a web-type wrapping material such as a net material currently available from Exxon Chemical Company sold under the trade designation "Bale Lok" net wrap. In the event twine is to be used, the baler 10 is provided with a swingable twine dispensing tube 62 located adjacent the front of the baler which performs in the usual way for dispensing a supply of twine to the bale 58. On the other hand, the baler 10 is also provided with an attachment in the form of apparatus 64 at the rear of the machine for dispensing net wrap or other similar wrapping material to the bale 58 at the appropriate time.

The wrapping apparatus 64 includes a housing 66 having a lower, stationary portion 66a and a hinged top portion 66b. Housing portions 66a,66b share a common rear wall 68 that spans the two sidewalls 18 of the baler in a horizontal direction and extends downwardly from the top of the top portion 66b to a point above the lower extremity of the bottom portion 66a whereby to define a net wrap outlet 70 in the vicinity of the belt roll 32.

The lower housing portion 66a also has a pair of opposite, left and right end walls 72 and 74, respectively, and a front wall 76 which spans the distance between the two end walls 72,74. The lower housing portion 66a is open along its top and bottom. The upper housing portion 66b also has a pair of opposite left and right end walls 78 and 80, respectively, a front wall 82 spanning the two end walls 78, 80, an inclined top wall 84 interconnecting the walls 76,78, and 80, and a horizontally extending bottom wall 86 which joins together the walls 78,80 and 82 along their lower extremities. The bottom wall 86 stops short of the common rear wall 68 and is downturned at that location to present an opening 88 through which the wrapper may be discharged from the upper housing portion 66b in the manner hereinafter described. A horizontal hinge 90 interconnects the top housing portion 66b with the lower housing portion 66a generally along the intersection of the two front walls 76,82 whereby to permit the top housing portion 66b to be swung out of its closed, operative position illustrated in the figures and into a rearwardly swung down, loading position to facilitate loading of individual rolls of wrapper material through the open area defined at the back of the top housing portion 66b when the latter is swung away from the common rear wall 68.

The top housing portion 66b serves as a type of trough or holder for a cylindrical roll 92 of wrapper material. Although the roll 92 is contained within the internal cavity defined by the upper housing portion 66b and lies against upper and lower locating structures 94 and 96 at the front of the housing, the floor 86 at the bottom of the housing, and the common wall 68 at the rear of the housing, nonetheless, such confinement does not prevent the web of wrapper material from being unwound from the roll 92 during use. In the preferred embodiment, the roll 92 is positioned within the top housing portion 66b in such a manner that the web unwraps from the roll 92 in a general clockwise direction viewing FIGS. 2 and 4, the web passing along the bottom wall 86 from the roll 92, and thence downwardly through the opening 88 to the main part of the dispensing mechanism as will now be described.

Situated within the lower housing portion 66a and spanning the distance between the two end walls 72,74 thereof, are two nip rollers 98 and 100 which are journaled for rotation by the end walls 72,74 and are positioned in contacting peripheral engagement with one another so that rotation of one of the rolls causes corresponding rotation of the other. In the preferred embodiment, the slightly more elevated roller 98 is the drive roller of the two, having a sheave 102 fixed thereto outboard of the left end wall 72, as illustrated in FIGS. 6 and 7. Preferably, the two rollers 98 and 100 are rubber-covered rollers such that their two peripheries press resiliently against one another in the formation of the feeding nip for the wrapper.

Slightly upstream from the nip rollers 98,100 is a single, free-wheeling spreader roller 104 that is not journaled by the sidewalls 72,74 of the lower housing portion 66a, but is instead supported between a pair of downwardly projecting rigid straps 106 (only one being illustrated) which are secured to the top housing portion 66b. The spreader roller 104 has its outer periphery provided with a double-acting helical vane 108 having a left hand lead at one end of the roller 104 and a right hand lead at the opposite end of the roller 104 such that the wrapper web engaging with the roller 104 tends to be spread out toward opposite ends of the roller 104 when the latter is rotated during linear advancement of the wrapper web. The spreader roller 104 extends substantially the full length of the nip rollers 98,100, and the wrapper web, after passing downwardly through the opening 88, is looped under the spreader roller 104 and thence up and over the nip roller 98 before passing downwardly through the nip between the nip rollers 98,100.

It is the function of the nip rollers 98,100 to pay out wrapping material from the roll 92 during each wrapping cycle and to feed the wrapper down through the outlet 70 and along a downwardly and forwardly inclined ramp 110 to the crop intake entrance 52 of the baler. It will be seen by viewing FIG. 1 that the ramp 110 extends from the housing outlet 70 to a position just below the guide roll 34 so as to provide a bottom support for the flimsy wrapping material as it is presented to the crop entrance 52. In practice, the ramp 110 may comprise a series of flat, rigid, laterally spaced straps or the like aligned with individual belts 36 along the bottom rear portion of the baler, such slats of the ramp 110 being spaced only slightly below the respective belts 36 so that the moving belts 36 can engage and move the wrapper along the ramp 110. Once the wrapper is presented to the crop intake opening 52, it is pulled around the lower roller 34 by the belts 36 and inserted within the nip point between the bale 50 and the lower roll 34. Such nip point is sufficiently aggressive as to grab the wrapper and feed it rearwardly and upwardly around the bale 50 in a counterclockwise direction viewing FIG. 1 as the rear run 36b of the belts 36 moves in such direction, thereby enveloping the finished bale with complete convolutions of the wrapper.

Each finished bale is wrapped with a predetermined length of the wrapper material such that the wrapper must be severed from the remainder of the roll 92 once the preselected length of the wrapper has passed through the nip rollers 98,100. For this purpose, the wrapping apparatus 64 includes cutoff mechanism broadly denoted by the numeral 112 and comprising a pair of cooperating components including an anvil 114 and a cutter 116. Preferably, the anvil 114 is stationary and the cutter 116 is movable toward and away from the anvil 114, although this arrangement could be reversed.

Dealing first with the anvil 114, this component comprises a long bar secured to a transverse bracket 118 that spans the end walls 72,74 of lower housing portion 66a. The anvil 114 is secured to the bracket 118 by a series of threaded fasteners 120 and is held in a level condition by the bracket 118 across and above the full width of the wrapper web W on one side of the path of travel of the wrapper W.

As illustrated perhaps best in FIG. 5, the anvil 114 includes a tapered nose 122 which extends the full length of the anvil 114 so as to present a pair of inclined surfaces 124 and 126 that converge outwardly generally toward the path of travel of the wrapper W. In the preferred embodiment, the upstream surface 124 has a higher angle of slope than the downstream surface 126. The two surfaces 124 and 126 merge into respective parallel sides 128 and 130. As illustrated in FIG. 2, the nose 122 of the anvil 114 is spaced a distance back from the normal path of travel of the wrapper W so that the nose 122 is normally out of contact with the wrapper W.

The other major component of the cut off mechanism 112 is the knife 116 which is adapted to swing toward and away from the anvil 114 in the manner illustrated in FIGS. 2, 3, and 4. The knife 116 includes a long tubular member 132 which is substantially the same length as the anvil 114, is disposed on the opposite side of the path of travel of the wrapper W from the anvil 114, and extends in parallel relationship to the anvil 114. The tubular member 132, which is annular in transverse cross section presenting a circular outermost periphery, has a longitudinal slot 134 which runs the full length of the member 132 and is adapted to wedgingly receive the nose 122 of anvil 114 when the knife 116 is swung to its fully operated position in engagement with the anvil 114, as illustrated in FIGS. 4 and 5. The cross-sectional annular configuration of the tubular member 132 presents the latter with an annular wall 136 (FIG. 5) which is otherwise continuous except for the slot 134. The outer, arcuate surface 138 of the wall 136 is smooth to avoid snagging engagement with the wrapper W during contact between the latter and the knife 116, while the intersection between the surface 138 and the slot 134 causes the presentation of a pair of cutting edges 140 and 142 along opposite extremities of the slot 134.

Preferably, the anvil 114 and the knife 116 are so adjusted that when the knife 116 is in engagement with the anvil 114, as illustrated in FIG. 5, the cutting edge 140 strikes the downstream inclined surface 126 of the nose 122 and the cutting edge 142 is very slightly spaced from the upstream inclined surface 124. Ideally, the interfitting relationship between the nose 122 and the slot 134 is such that the cutting edge 140 makes the cutting severance of the web while the cutting edge 142 is merely a backup or secondary edge which, while assisting in tightly clamping the web in place against the anvil 114, normally does not itself perform a severing action. It will be appreciated, however, that edge 142 may also perform severance, even in lieu of the other edge 140, without departing from the principles of the present invention.

The fasteners 120 of the anvil 114 pass through elongated holes (not shown) in the bracket 118 which are oriented with their longer dimensions extending upwardly and rearwardly generally toward the nip roller 98. Upon loosening the fasteners 120, the anvil 114 may thus be adjustably shifted up and down along the bracket 118 to adjust the level of contact between the surfaces 124,126 and edges 140,142.

Preferably, the anvil 114 and the knife tube 132 are constructed from materials of two different hardnesses, with the anvil 114 being the softer of the two. Although a number of different materials have been found to be suitable for the anvil 114, in its preferred form the anvil 114 is constructed from aluminum while the knife tube 132 is constructed from steel.

The knife tube 132 is supported in its swinging movement toward and away from the anvil 114 by a pair of generally L-shaped, left and right hangers 144 and 146 (FIGS. 6-10), each hanger 144,146 having an inturned, generally horizontally extending leg 148 passing through an arcuate slot 150 in the corresponding end wall 72 or 74 and connected to the proximal end of the tubular member 32 via fasteners 152. The other leg 154 of each hanger 144,146 extends upwardly along the outside of the lower housing portion 66a adjacent the corresponding end wall 72 or 74. At their upper ends, the upright legs 154 are swingably connected to their corresponding end walls 72 or 74 via respective transverse pivots 156.

Swinging of the knife 116 between its operated and retracted positions is carried out by a set of single acting hydraulic cylinders. The fully operated position in FIG. 4 is also the standby position, while the cut off mechanism 112 waits to be actuated between wrapping cycles. As illustrated in FIGS. 6 and 7, a single hydraulic cylinder 158 is connected between the end wall 72 of the lower housing portion 66a and an upper extension of the left hanger 154 such that when the ram 158a of the cylinder 158 is extended as illustrated in FIG. 7, the left hanger 154, and hence the entire knife 116, is caused to swing rightwardly into the retracted position of FIG. 7 from the operated position of FIG. 6. On the other hand, for swinging the knife 116 in the opposite direction into its operated position of FIG. 6, a pair of left and right hydraulic cylinders 160 and 162, respectively, are provided at opposite ends of the knife 116. Each cylinder 160,162 is connected between its respective end wall 72,74 and the extended proximal portion of the corresponding hanger 154 such that, when the rams 160a and 162a of the cylinders 160,162 are extended as illustrated in FIGS. 6 and 8, the hangers 154 are rocked in a direction to throw the knife tube 132 into contact with the anvil 114. The hydraulic circuitry involving the cylinders 158,160 and 162 is such that while the cylinders 160,162 cooperate with one another to provide joint power in moving the knife 116 to its operated position, the single return cylinder 158 does not interfere with the cylinders 160,162 at this time, nor do the cylinders 160,162 interfere with the action of the return cylinder 158 during its extension stroke.

Power for driving the nip rollers 98,100 is supplied via a shaft 164 associated with the lower rear belt guide roll 32, which fixedly carries a drive sheave 166 (FIGS. 6, 7, and 10) outboard of the left sidewall 18 of the baler. The drive sheave 166 is entrained by an endless drive belt 168 that is also looped around the driven sheave 102 associated with the nip roller 98. Although the drive sheave 166 may be rotating most of the time because of the corresponding rotation of the belt idler roller 32, the nip roller 98 will not be rotating unless an idler clutch sheave 170 rotatably carried by the lower end of the left hanger 154 has been tightly entrained by the drive belt 168 due to the positioning of the knife 116 in its fully retracted position, as illustrated in FIG. 7. At other times, when the knife 116 is in its operated position, the clutch sheave 170 is out of engagement with the drive belt 168, as shown in FIG. 6, so as to cause the belt 168 to be unable to rotate the driven sheave 102.

Figure 10:
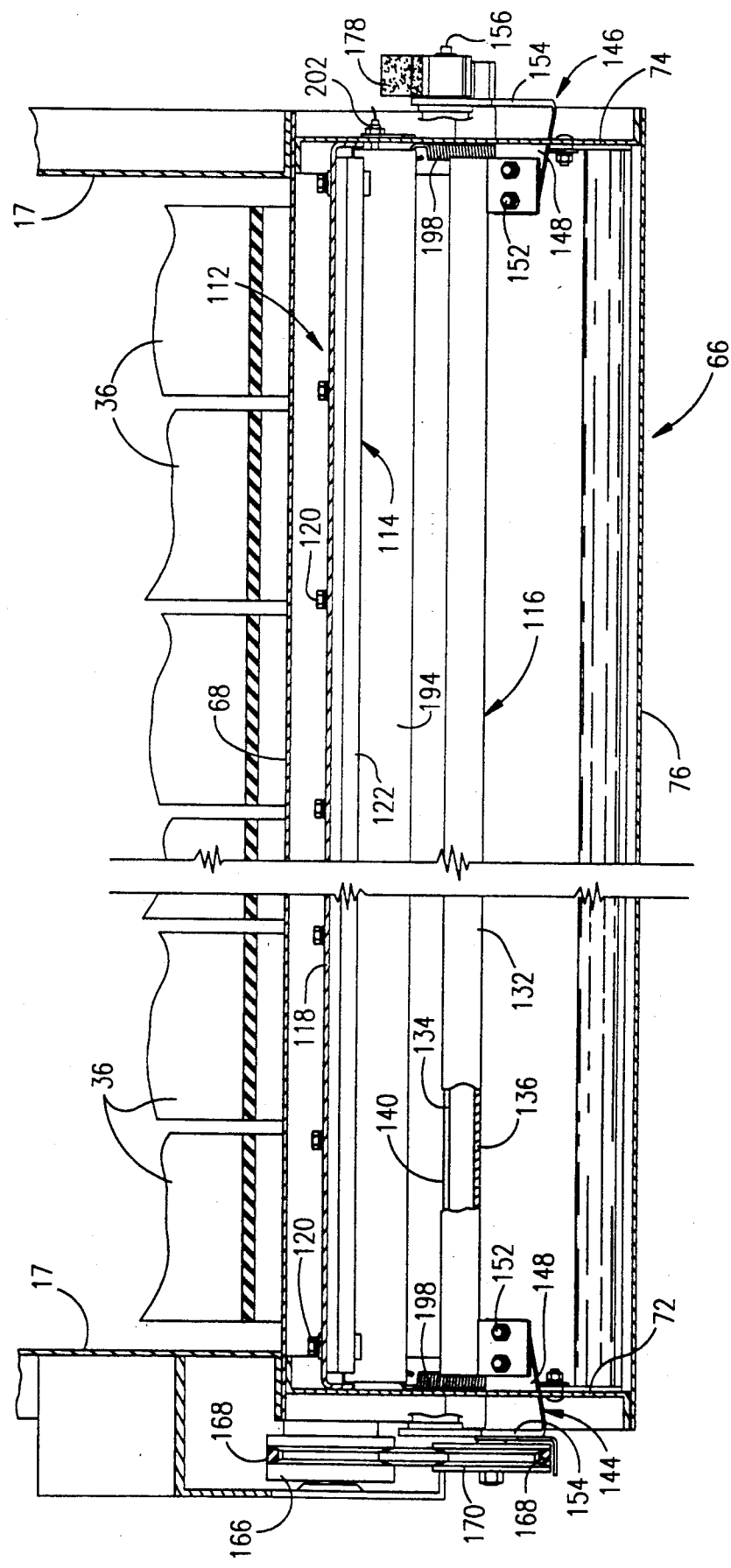
FIG. 10 is an enlarged, fragmentary cross-sectional view of the cutoff mechanism taken substantially along line 10—10 of FIG. 2.

With reference to FIGS. 8, 9 and 10 in particular, a brake broadly denoted by the numeral 172 is shown in connection with the right side of the housing 66 for stopping rotation of the nip rollers 98,100 as the knife 116 moves into its fully operated position. In this respect it will be seen that a shaft 174 associated with the nip roller 98 projects beyond the right end wall 74 and fixedly carries a brake disc 176 forming one part of the brake 172. The other major portion of the brake 172 is carried by the right hanger 154 and comprises a brake pad 178 disposed for contacting engagement with the periphery of the brake disc 176 when the knife 116 is in its operated position. The pad 178 is carried on the outer end of a spring-loaded bar 180 which can swivel to a limited extent about the pivot 156 but is prevented from doing so to a substantial extent by the spring assembly 182 which yieldably biases the bar 180 and pad 178 in an upward counterclockwise direction, viewing FIGS. 8 and 9. When the knife is in its retracted position as in FIG. 9, the pad 178 is fully out of engagement with the brake disc 176.

A spring-loaded latch mechanism broadly denoted by the numeral 184 and illustrated in FIGS. 6-9 includes a pair of hooks 186 on the outside of the end walls 78,80 of the upper housing portion 66b, as well as a pair of outwardly projecting posts 188 on the lower housing portion 66a for engagement by the hooks 186. When the posts 188 are captured by the hooks 186, the latch mechanism 184 is latched, whereby to retain the upper housing portion 66b in its closed position as shown in the figures, while, when the posts 188 are released by the hooks 186, the latch mechanism 184 is likewise released to permit the upper housing portion 66b to be swung down into a loading position about the hinge 90.

OPERATION

The general mode of operation of the baler 10 should be apparent from the foregoing description. Suffice it, therefore, to explain that a relatively small core of crop material begins tumbling forwardly within the empty baling chamber 50 at the commencement of a baling cycle as a result of the upwardly moving rear belt runs 36b and the generally downwardly and forwardly moving front belt runs 36a. As crop material continues to be picked up from the field and introduced into the chamber 50 through the open entrance 52, the core starts to grow in size and expands against the yieldable resistance offered by the belts 36. The bale continues to grow and the belts 36 continue to expand while rotating the bale until the bale finally reaches its full size as indicated in FIG. 1 in which the full size bale is denoted by the numeral 58. During this period of bale formation, the wrapper apparatus 64 is in the standby condition illustrated in FIGS. 4, 5, 6, and 8. The nip rollers 98,100 are idle at this time, although the drive sheave 166 in FIGS. 6 and 7 has been continuously rotating. Typically, the relatively short lead portion of the wrapper W projecting downwardly beyond the nip rollers 98,100, and hereinafter referred to as the "leader", is held in a clamped condition between the knife tube 132 and the anvil 114 as illustrated in FIGS. 4 and 5. It is to be appreciated, however, that it is not essential for the leader to be retained in this manner after a preceding cutting cycle; instead, the leader may simply dangle loosely between the opposing, transverse bracket 118 and the transverse guide plate 192 which span the end walls 72,74 on opposite upper and lower sides of the wrapper W.

As the bale 58 reaches full size, such condition is appropriately sensed by means not illustrated and either signaled to the operator for manual activation of the wrapping cycle, or automatically signaled to the wrapping apparatus 64 to commence wrapping of the bale 58. The baler 10 may or may not be stopped in its forward progress at this time. As will be seen, because the wrapper is introduced into the baling chamber 50 adjacent the lower rear portion thereof and is subsequently wrapped around the bale in a counterclockwise viewing FIG. 1, the wrapper does not cross and block the crop entrance 52 until near the end of a complete revolution of the bale 58. Therefore, crop inflow need not be terminated until just before the wrapper crosses the entrance 52.

In any event, as the signal to start the wrap cycle is received by the apparatus 64, oil under pressure is supplied to the cylinder 158 in FIGS. 6 and 7 to extend its ram 158a and thus cause the hangers 144,146 and the knife 116 to be swung about the pivots 156 into a retracted position, as illustrated in FIG. 7. This causes the clutch idler sheave 170 to come into tight engagement with the previously loose drive belt 168 and tighten the same about the drive sheave 102 such that driving power from the drive sheave 166 is transmitted to driven sheave 102 by the belt 168. As driven sheave 102 starts to rotate, it causes corresponding rotation of the nip roller 98 since the driven sheave 102 is fixed to the shaft 98a of the nip roller 98. Rotation of nip roller 98 in turn causes rotation of the companion nip roller 100 in view of the contacting interengagement of the two rollers, thus feeding the leader of the wrapper downwardly between the separated knife 116 and anvil 114 and into and through the outlet 70 onto the ramp 110, as illustrated in FIG. 2. Inasmuch as the belts 36 continue to run at this time so the bale 58 will continue to be rotated, whether crop material is still being added or not, the leader of the wrapper W is presented by the ramp 110 to the underside of the belts 36 beneath the guide roller 32. The belts 36 are close enough to the ramp 110 that they engage the wrapper and pull it down the ramp and forward to the intake entrance 52 where the wrapper coils upwardly around the roller 34 with the belts 36 and is received by the aggressive nip between the bale 58 and the roller 34. Once the wrapper is tightly gripped by the rotating bale 58, the wrapper is aggressively pulled from the roll 92 by the bale 58 itself, without the continued need for the nip rollers 98,100. Preferably, the wrapper encircles the bale at least 2-2 ½ times, depending upon personal preferences.

Ideally, the nip rollers 98,100 are driven at peripheral speeds which are very slightly slower than the peripheral speed of the rotating bale 58. Hence, once the bale 58 grips the wrapper and begins coiling the wrapper around itself, the wrapper is placed in tension between the bale 58 and the nip rollers 98,100 such that the wrapper is tightly applied to the peripheral surface of the bale. The slight disparity in peripheral speeds of the bale 58 and the nip rollers 98,100 is accommodated by the slightly stretchable nature of the net wrap material normally applied to the bale, and also by the inherent slippage made available in the belt drive system for the nip rollers 98,100.

The nip rollers 98,100 are operated for a period of time that will produce a length of wrapper corresponding to the number of wraps desired to be placed around the bale 58. When this period of time has elapsed, the hydraulic cylinders 160,162 are operated to extend their rams 160a,162a, causing the hangers 144,146 to swing toward the anvil 114 in the direction illustrated in FIG. 6, slackening the belt drive 168 and thus disconnecting the nip rollers 98, 100 from driving power. This action also has the effect of severing the wrapper, as will be explained in more detail below. Although the duration of the operating period for the nip rollers 98,100 can be carried out in a number of ways, in the preferred embodiment, a hydraulic cylinder (not shown) which is coupled with the twine dispensing tube 62 for operating the latter is also hydraulically coupled with the circuit which supplies oil to the cylinders 158,160 and 162. The twine tube 62 is activated at the same time the nip rollers 98,100 are engaged, even though no twine is being dispensed, and when the twine tube 62 reaches the end of its stroke as determined by the full extension of its cylinder, the hydraulic flow is directed into the cylinders 160,162 to extend the rams 160a and 162a for disengaging the nip rollers 98,100 and actuating the cutting apparatus 112.

Once the leader of the wrapper W is gripped between the bottom of the belts 36 and the top of the ramp 110, the wrapper becomes drawn into engagement with an actuating lever 194 that is pivoted about a transverse pivot 196. Normally, prior to actuation, the lever 194 is held by a tension spring 198 in an unactuated position as illustrated in FIG. 4. However, when the leader of the wrapper W is tightened as aforesaid and engaged with the lever 194, the latter is shifted leftwardly to an actuated position, a shown in FIGS. 2 and 3, in which position a pair of switch elements 200 and 202 (see also, FIG. 4) are brought into actuating alignment with one another. Such alignment of the switches 200,202 may be used to close a signal circuit by which a signal light or other suitable device in the tractor cab may be utilized to alert the operator that wrapper is indeed being dispensed by the wrapping apparatus 64 during the time the apparatus 64 is supposed to be dispensing material.

As the cylinders 160,162 are extended from their FIG. 7 positions, the cutter 116 is swung leftwardly from its FIG. 2 position into engagement with the wrapper W and toward the anvil 114. Although the wrapper W is moving linearly at this time, the arcuate surface 138 of the knife tube 132 protects the Wrapper W from snagging engagement with either of the cutting edges 140,142 so that the wrapper W simply slides smoothly across the knife tube 132 even though the wrapper W is deflected laterally out of its normal path of travel.

Then, as the knife tube 132 approaches the anvil 114 and the nose 122 enters the slot 134, the wrapper W is forced into the slot 134 along with the nose 122 and is caused to become progressively clamped between the cutting edges 140,142 and the cooperating clamping surfaces 124 and 126 of the nose 122. By the time the nose 122 is fully inserted into the slot 134, the wrapper W will have become sufficiently clamped between the knife tube 132 and the anvil 114 and bent over the cutting edge 140 as to cause a clean and sure severance of the wrapper W clear across the entire width thereof. Preferably, the anvil 114 is adjusted such that severance of the wrapper W occurs along the edge 140 and not along the edge 142; however, it is of no particular consequence if actual severance also occurs along the edge 142 in the event the anvil 114 is slightly misaligned with respect to the slot 134 of the knife tube 132.

In any event, by virtue of the slot 134 and the progressive entry of the nose 122 into such slot, the cutter of the present invention is significantly more forgiving in terms of misalignment and timing than prior wrapper cutters of this general type. Whereas in the past perfect impact was required between the cutter and the anvil all along the full length of the cutter, such perfection is not required in the present invention. Instead, as the wrapper becomes stuffed by the nose 122 into the slot 134, the wrapper becomes gripped sufficiently enough to cause the wrapper to be drawn tightly across and severed by the cutting edge 140 even though the edge 140 may not as yet have impacted the clamping surface 126 of the nose 134. Thus, misalignment and warpage of the cutter 132 and the anvil 114 relative to one another is more readily accommodated by the present invention than the prior art, to the end that reliability of cut is increased. Furthermore, the cut itself tends to be less ragged than in prior constructions.

Additionally, it will be appreciated that the timing of the interaction between the knife tube 132 and the anvil 114 is less critical than the timing between prior knives and their cooperating anvils. In prior constructions, dragging the moving wrapper across a sharp cutting edge prior to impact with the anvil risked snagging the wrapper on the knife edge and causing premature severance. If the knife were out of alignment, a portion of it could snag part of the wrapper while the other part sought to continue moving, ultimately resulting in an incomplete or ragged cut.

With the present invention the protective arcuate outer surface of the knife tube 132 prevents accidental snagging of the wrapper during the time the wrapper continues to be paid out, yet deflected laterally in preparation for severance by interfitting engagement of the anvil 114 and the knife tube 132. It is only after the nose 122 enters the slot 134 and distorts the web by bending it across the cutting edge 140, that actual severance can occur. Consequently, the precise timing between discontinuance of the forward advancement of the wrapper W and cooperating interengagement of the knife and anvil is not as critical as in the past. Nor is the interengagement between the cutting edge 140 and the clamping surface 126 required to be carried out at precisely the same instant all along the length of the edge 140 as has essentially been true in prior constructions in order to provide a good, straight cut.

Following severance of the wrapper, rotation of the bale 58 may be terminated and the rear portion of the baler opened to discharge the completed and wrapped bale. In the preferred embodiment, the rear halves of the opposite sidewalls 18 may be separated from the front halves along a parting line designated by the numeral 204 in FIG. 1 and swung upwardly and rearwardly about a pivot 206 with the rolls 30,32, and 34 and the rear belt runs 36b for ejection of the bale 58. Hydraulic means for opening the rear of the baler are not illustrated herein, but are well understood by those skilled in the art.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a round baler having apparatus for wrapping successive bales produced by the baler with individual lengths of wrapper material cut from a roll of the wrapper, improved cutoff mechanism for the wrapper comprising:

an elongated anvil component on one side of the path of travel of the wrapper as it is fed past the mechanism and spanning the full length width of the wrapper in transverse relation thereto, said anvil component having an outwardly projecting, transversely tapered blunt noise presenting a pair of inclined clamping surfaces that converge toward one another as the path of travel of the wrapper is approached;

an elongated cutter component on the opposite side of the path of travel of the wrapper from the anvil component and spanning the full width of the wrapper in transverse relation thereto; and means for shifting at least one of said components into clamping engagement with the other when the wrapper is located therebetween for severing a predetermined length of the wrapper from the roll, said cutter component having means defining an elongated longitudinally extending slot disposed for receiving the nose of the anvil component when the components are clamped together, said slot-defining means including a pair of longitudinally extending, laterally spaced sharp edges on opposite sides of the slot disposed for deflecting the wrapper around the nose when the latter is received in the slot and for pinching the wrapper against at least one of said inclined surfaces of the anvil component to cause severance of the wrapper.

2. In a round baler as claimed in claim 1,
said anvil component being stationary, said cutter component being mounted for shifting movement toward and away from said anvil component.

3. In a round baler as claimed in claim 1,
said anvil component and said cutter component being adjustable in a manner to cause severance of the wrapper by an edge of the cutter component engaging that surface of the anvil nose which faces in a generally downstream direction with respect to the direction of wrapper travel.

4. In a round baler as claimed in claim 1,
said cutter component being constructed from a harder material than the material used for said anvil component.

5. In a round baler as claimed in claim 4,
said cutter component being constructed from steel and said anvil component being constructed from aluminum.

6. In a round baler as claimed in claim 1,
said cutter component comprising an elongated member extending in parallel relationship to said anvil component and presenting a guide surface which is disposed for sliding contact with the wrapper as the wrapper is being dispensed to the bale and the cutter component is shifting toward the anvil component for clamping engagement therewith,
said guide surface being positioned to prevent the wrapper from being deflected over one of said edges and into the slot until entry of the anvil nose into the slot, whereby to prevent premature severance of the wrapper.

7. In a round baler as claimed in claim 6,
said guide surface being transversely arcuate with respect to the longitudinal axis of the member.

8. In a round baler as claimed in claim 7,
said member being tubular in transverse cross-section, having an annular outer wall which is interrupted by said slot and which presents said guide surface along opposite extremities of said slot.

9. In a round baler having apparatus for wrapping successive bales produced by the baler with individual lengths of wrapper material cut from a roll of the wrapper, improved cutoff mechanism for the wrapper comprising:
a cutter component disposed on one side of the path of travel of the wrapper as the latter is dispensed to the bale and extending across the full width of the wrapper in transverse relation thereto,
said cutter component having a longitudinal slot therein presenting at least one cutting edge;
a blunt anvil component disposed on the opposite side of the path of travel of the wrapper from the cutter component and extending in parallel relationship to the latter; and
means for shifting at least one of said components into clamping engagement with the other when the wrapper is located therebetween for severing a predetermined length of the wrapper from the roll,
said anvil component being positioned to enter said slot and bend the wrapper over said cutting edge to sever the wrapper when the components are engaged with one another,
said cutter component having a guide surface disposed for sliding contact with the wrapper during dispensing movement of the wrapper toward the bale,
said cutting edge being maintained out of severing engagement with the wrapper by the guide surface prior to the anvil component entering said slot, whereby to prevent premature severance of the wrapper.

10. In a round baler as claimed in claim 9,
said guide surface being transversely arcuate.

11. In a round baler as claimed in claim 10,
said cutter component comprising a tube having an annular outer wall which is interrupted by said slot,
said cutting edge extending along one side of the slot to define a lateral extremity of the latter,
said guide surface comprising an outer surface of said wall of the tube.

12. In a round baler as claimed in claim 9,
said anvil component having a nose extending along the length thereof which is provided with a tapered transverse cross-sectional configuration,
said nose presenting a pair of inclined clamping surfaces that converge toward one another as the path of travel of the wrapper is approached,
said nose received within said slot when the components are engaged, and at least one of said inclined surfaces being disposed for cooperating engagement with said cutting edge of the cutter component when the nose is received within the slot.

13. In a round baler as claimed in claim 12,
said cutter component having a pair of cutting edges along opposite sides of the slot for increased reliability in severing the wrapper,
said guide surface being operative to prevent severance of the wrapper by either of said edges until the wrapper is deflected into the slot by the anvil component when the components are fully engaged with one another.

14. In a round baler as claimed in claim 9,
said anvil component being stationary,
said cutter component being mounted for shifting movement toward and away from said anvil component.

15. In a round baler having a baling chamber within which successive bales of crop material are formed and wrapped with individual lengths of wrapper material, improved wrapper apparatus comprising:
means for housing a roll of the wrapper material to be used and for allowing the wrapper to be paid out as the bale is being wrapped;
a pair of nip rollers receiving the wrapper therebetween and intermittently drivable in directions to pull successive, predetermined lengths of the wrapper from the roll and present such lengths to the baling chamber;
a drive operably couplable with said nip rollers for supplying driving power to the latter during the period of time that the drive is coupled with the rollers;
an elongated, tubular member disposed on one side of the path of travel of the wrapper in downstream relation to said nip rollers with respect to the direction of movement of the wrapper and extending across the full width of the wrapper in transverse relation thereto,
said member being mounted for shifting movement generally back and forth across the path of travel of the wrapper to engage the wrapper and deflect the same out of its normal path of travel for severance,
said member having a longitudinally extending slot therein extending the full width of the wrapper and presenting at least one cutting edge;

an elongated blunt anvil disposed on the opposite side of the path of travel of the wrapper from the member and extending in parallel relation to the latter, said anvil being positioned to enter said slot and bend the wrapper over said cutting edge to sever the wrapper when the member is in an operated position engaged with the anvil; and a clutch carried by said member and operable to couple the drive with the nip rollers when the member is in a retracted position spaced away from the anvil for causing the nip rollers to pay out a predetermined length of the wrapper for subsequent severance by the member and the anvil when the member is shifted into its operated position and the drive is uncoupled from the drive rollers.

16. In a round baler as claimed in claim 15, said member supporting a brake movable with the member during shifting between said operated and retracted positions, said brake being disposed for engagement with said nip rollers as the member is shifted to its operated position whereby to stop rotation of the nip rollers after the drive has been uncoupled from the nip rollers.

17. In a round baler as claimed in claim 15, said nip rollers having a driven sheave associated with one of the rollers for receiving input power, said drive including a constantly rotating drive sheave and a belt looped around said drive sheave and said driven sheave, said clutch including an idler sheave on said member in disposition for tightening said belt when the member is in its retracted position and loosening said belt when the member is in its operated position.

18. In a round baler as claimed in claim 15, said member having a guide surface disposed for sliding contact with the wrapper as the wrapper is deflected toward the anvil by the member and the wrapper continues to be paid out toward the bale, said guide surface being disposed to maintain the wrapper out of severing engagement with said cutting edge prior to the anvil entering said slot, whereby to prevent premature severance of the wrapper.

19. In a round baler as claimed in claim 18, said guide surface being transversely arcuate with respect to the longitudinal axis of the member.

20. In a round baler as claimed in claim 19, said member having an annular outer wall which is interrupted by said slot and which presents said guide surface along opposite extremities of said slot.

21. In a round baler as claim in claim 15, said anvil having a nose extending along the length thereof which is provided with a tapered transverse cross-sectional configuration, said nose presenting a pair of inclined clamping surfaces that converge toward one another as the path of travel of the wrapper is approached, said nose being received within said slot when the member is engaged with the anvil, and at least one of said inclined surfaces being disposed for cooperating engagement with said cutting edge of the member when the nose is received within the slot.

22. In a round baler as claimed in claim 21, said member having a pair of cutting edges along opposite sides of the slot for increased reliability in severing the wrapper, said guide surface being operative to prevent severance of the wrapper by either of said edges until the wrapper is deflected into the slot by the anvil when the member is fully engaged with the latter.

23. In a round baler having apparatus for wrapping successive bales produced by the baler with individual lengths of wrapper material cut from a roll of the wrapper, improved cutoff mechanism for the wrapper comprising:

an elongated blunt anvil component on one side of the path of travel of the wrapper as it is fed past the mechanism and spanning the full width of the wrapper in transverse relation thereto;

an elongated cutter component on the opposite side of the path of travel of the wrapper from the anvil component and spanning the full width of the wrapper in transverse relation thereto; and means for shifting at least one of said components into clamping engagement with the other when the wrapper is located therebetween for severing a predetermined length of the wrapper from the roll, said cutter component having an elongated, longitudinally extending slot therein presenting at least one cutting edge, said anvil component being positioned to enter said slot and bend the wrapper over said cutting edge to sever the wrapper when the components are clamped together.

24. In a round baler as claimed in claim 23, said anvil component being stationary, said cutter component being mounted for shifting movement toward and away from said anvil component.

* * * * *